US 12,459,110 B2

United States Patent
Kabutan et al.

(10) Patent No.: US 12,459,110 B2
(45) Date of Patent: Nov. 4, 2025

(54) DETERMINATION OF PICKING ORDER OF WORKPIECES

(71) Applicant: KABUSHIKI KAISHA YASKAWA DENKI, Kitakyushu (JP)

(72) Inventors: Ryo Kabutan, Fukuoka (JP); Ryohei Suzuki, Tokyo (JP); Takuya Kadoya, Fukuoka (JP)

( * ) Notice: Subject to any disclaimer, the term of this patent is extended or adjusted under 35 U.S.C. 154(b) by 196 days.

(21) Appl. No.: 18/354,653

(22) Filed: Jul. 19, 2023

(65) Prior Publication Data
US 2024/0051117 A1    Feb. 15, 2024

(30) Foreign Application Priority Data
Aug. 9, 2022 (JP) .................................. 2022-127016

(51) Int. Cl.
B25J 9/00    (2006.01)
B25J 9/12    (2006.01)
(Continued)

(52) U.S. Cl.
CPC ........... B25J 9/0093 (2013.01); B25J 9/1653 (2013.01); B25J 9/1656 (2013.01); B25J 9/1697 (2013.01);
(Continued)

(58) Field of Classification Search
CPC ........ B25J 9/0093; B25J 9/1697; B25J 9/161; B25J 19/023; B25J 9/1669; B25J 19/021;
(Continued)

(56) References Cited

U.S. PATENT DOCUMENTS

| | | | | |
|---|---|---|---|---|
| 2012/0165972 A1* | 6/2012 | Wappling | ............... | B25J 9/1687 700/213 |
| 2016/0075521 A1* | 3/2016 | Puchwein | .............. | B25J 9/1612 700/218 |

(Continued)

FOREIGN PATENT DOCUMENTS

| | | |
|---|---|---|
| JP | H10-249765 | 9/1998 |
| JP | 2018-051684 | 4/2018 |

(Continued)

OTHER PUBLICATIONS

Han Shuai D et al, "Toward Fast and Optimal Robotic Pick-and-Place on a Moving Conveyor", IEEE Robotics and Automation Letters, IEEE, vol. 5, No. 2, Dec. 23, 2019, p. 446-p. 453.

(Continued)

*Primary Examiner* — Abby Lin
*Assistant Examiner* — Kayla R. Doros
(74) *Attorney, Agent, or Firm* — SOEI PATENT & LAW FIRM

(57) ABSTRACT

A robot system includes circuitry and a robot. The circuitry is configured to set, based on a plurality of workpieces that move along a conveying surface, a window corresponding to n workpieces of the plurality of workpieces, according to an inflow order that is an order in which the plurality of workpieces have moved along the conveying surface, where n>1. The circuitry is further configured to determine a picking order by an optimization algorithm, based on a position of each of the n workpieces. The picking order is an order of picking one or more of the workpieces from the conveying surface and is different from the inflow order. The circuitry is further configured to select m workpieces from the window based on the picking order, where n>m. The robot is configured to pick the selected m workpieces from the conveying surface in the picking order.

20 Claims, 8 Drawing Sheets

(51) Int. Cl.
*B25J 9/16* (2006.01)
*B25J 13/08* (2006.01)
*B65G 1/00* (2006.01)

(52) U.S. Cl.
CPC .............. *B25J 13/088* (2013.01); *B65G 1/00* (2013.01); *B25J 9/126* (2013.01)

(58) Field of Classification Search
CPC ...... B25J 9/1602; B25J 9/1628; B25J 9/1656; B25J 9/1658; B25J 9/1661; B25J 9/1653; B25J 13/088; B25J 9/126; B25J 9/1664; B25J 9/02; B25J 9/1679; G05B 2219/40053; G05B 2219/39102; G05B 2219/39104; G05B 2219/39106; G05B 2219/40425; G05B 19/4182; G05B 2219/45063; G05B 2219/40007; G05B 2219/39361; G05B 2219/2669; G06T 7/70; G06T 2207/20081; G06T 7/75; G06T 2207/20084; G06T 1/0014; G06T 2207/30164; G06N 3/086; B65G 1/137; B65G 2203/041; B65G 2203/0208; B65G 47/06; B65G 47/905; B65G 47/91; B65G 47/90; B65G 47/52; B65G 1/00; B65G 1/1371; B23Q 7/046; B23Q 7/047
See application file for complete search history.

(56) References Cited

U.S. PATENT DOCUMENTS

| | | | | |
|---|---|---|---|---|
| 2016/0151916 A1* | 6/2016 | Kanno | ................... | B25J 9/1697 700/228 |
| 2018/0085922 A1 | 3/2018 | Ooba | | |
| 2018/0194573 A1* | 7/2018 | Iwai | ....................... | B25J 9/1697 |
| 2019/0184559 A1* | 6/2019 | Lager | .................... | B25J 9/1669 |
| 2020/0156236 A1* | 5/2020 | Lager | ....................... | B25J 9/163 |
| 2021/0101242 A1 | 4/2021 | Oowatari | | |
| 2021/0269244 A1* | 9/2021 | Ahmann | ............... | B65G 1/0492 |
| 2021/0387818 A1* | 12/2021 | Sugano | .................. | B65G 47/91 |
| 2023/0288944 A1 | 9/2023 | Kumagai et al. | | |

FOREIGN PATENT DOCUMENTS

| | | |
|---|---|---|
| JP | 6553568 | 7/2019 |
| JP | 2020-148613 | 9/2020 |
| JP | 2021-058956 | 4/2021 |
| JP | 2021-171834 | 11/2021 |
| JP | 2022-066882 | 5/2022 |
| WO | 2018/210404 | 11/2018 |
| WO | 2021/229746 | 11/2021 |

OTHER PUBLICATIONS

Mattone R et al, "Sorting of items on a moving conveyor belt. Part 2: performance evaluation and optimization of pick-and-place operations", Robotics and Computer Integrated Manufacturing, Elsevier Science Publishers BV., Barking, GB, vol. 16, No. 2-3, Apr. 1, 2000, p. 81-p. 90.

Extended Search Report in corresponding European Application No. 23183800.4, dated Dec. 14, 2023.

Office Action issued in Japanese Patent Application No. P2022-127016, dated Feb. 6, 2024 (with English partial translation).

* cited by examiner

*Fig.7*

```
                                                        ⎫ 300
  T = {φ:0}    ⎫ 301
  S = {φ:()}   ⎭
  for 1 ≤ k < n do
    if k = 1
    for U ← (select one from A, B, C) do
      if U = {A}
        T[{A}] = min{0+ GetPickAndPlaceTime (x_A, y_A)}
                i∈{A}
              = GetPickAndPlaceTime (x_A, y_A)
        S[{A}] = A
      if U = {B}
        T[{B}] = min{0 +GetPickAndPlaceTime (x_B, y_B)}   ⎫ 302
                i∈{B}
              = GetPickAndPlaceTime (x_B, y_B)
        S[{B}] = B
      if U = {C}
        T[{C}] = min{0 +GetPickAndPlaceTime (x_C, y_C)}
                i∈{C}
              = GetPickAndPlaceTime (x_C, y_C)
        S[{C}] = C
    if k = 2
    for U ← (select two from A, B, C) do
      if U = {A, B}
        T[{A, B}] = min{T[{A}] + GetPickAndPlaceTime (x_B+v_c×T[{A}], y_B),
                   i∈{A,B}  T[{B}] + GetPickAndPlaceTime (x_A+v_c×T[{B}], y_A)}
        S[{A, B}] = A→B or B→A
      if U = {A, C}
        T[{A, C}] = min{T[{A}] + GetPickAndPlaceTime (x_C+v_c×T[{A}], y_C),   ⎫ 303
                   i∈{A,C}  T[{C}] + GetPickAndPlaceTime (x_A+v_c×T[{C}], y_A)}
        S[{A, C}] = A→C or C→A
      if U = {B, C}
        T[{B, C}] = min{T[{B}] + GetPickAndPlaceTime (x_C+v_c×T[{B}], y_C),
                   i∈{B,C}  T[{C}] + GetPickAndPlaceTime (x_B+v_c×T[{C}], y_B)}
        S[{B, C}] = B→C or C→B
    if k = 3
    for U ← (select three from A, B, C) do
      if U = {A, B, C}
        T[{A, B, C}] = min{T[{A, B}] + GetPickAndPlaceTime (x_C+v_c×T[{A, B}], y_C),
                     i∈{A,B,C}  T[{A, C}] + GetPickAndPlaceTime (x_B+v_c×T[{A, C}], y_B),   ⎫ 304
                                T[{B, C}] + GetPickAndPlaceTime (x_A+v_c×T[{B, C}], y_A)}
        S[{A, B, C}] = {A→B}→C,{A→C}→B,{B→A}→C,
                       {B→C}→A,{C→A}→B,or{C→B}→A
  return S[{A, B, C}]
```

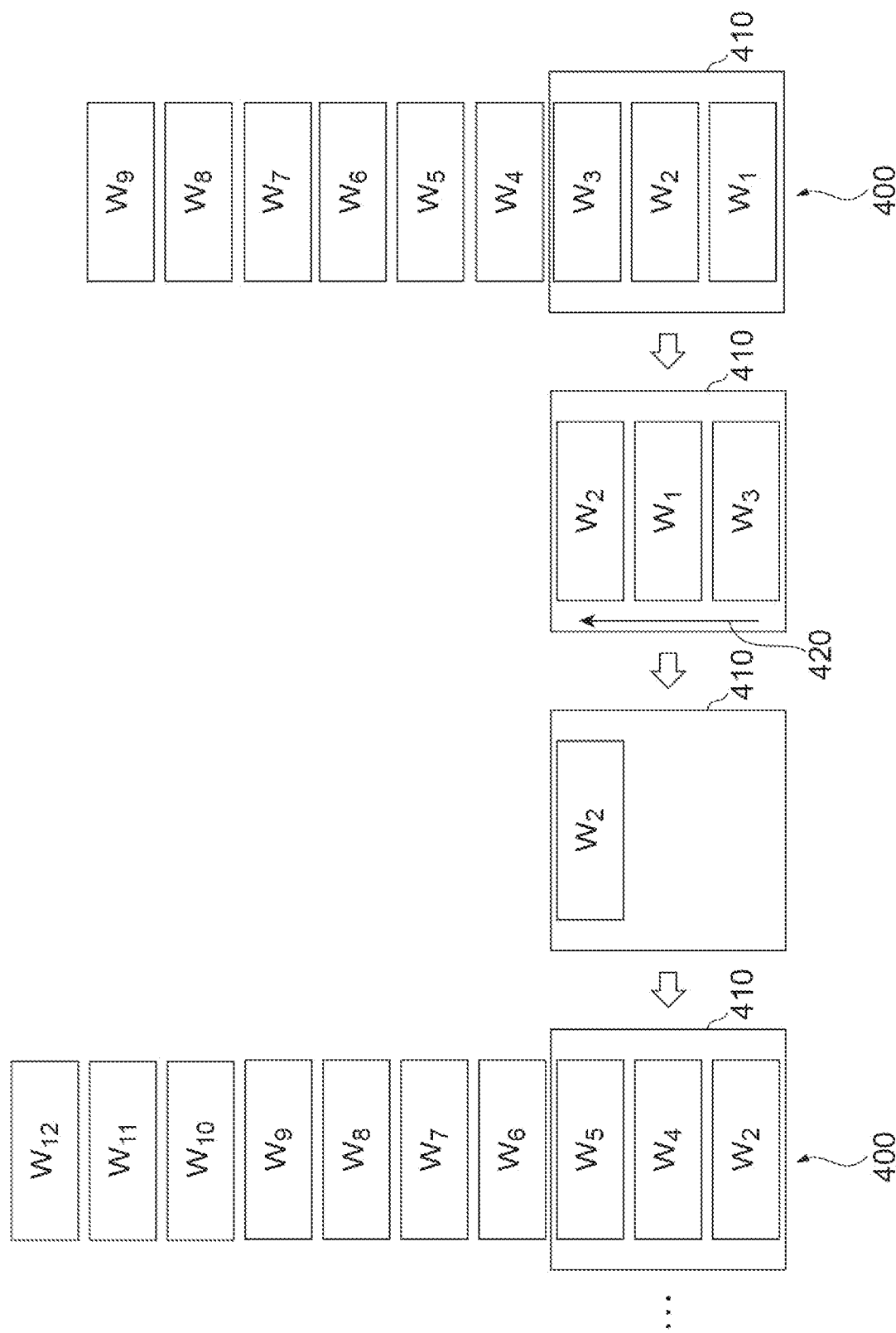

DETERMINATION OF PICKING ORDER OF WORKPIECES

CROSS-REFERENCE TO RELATED APPLICATIONS

This application is based upon and claims the benefit of priority from Japanese Patent Application No. 2022-127016, filed on Aug. 9, 2022. The entire contents of which are incorporated herein by reference.

BACKGROUND

Field

An aspect of the present disclosure relates to a robot system, a workpiece management system, a robot control method, and a workpiece management program.

Description of the Related Art

Japanese Patent Application Publication No. 2021-171834 describes a robot control device for controlling a robot that stores an item in a container. The device extracts candidate patterns of positions and postures of a plurality of items in a container based on first characteristics of the plurality of items, determines one candidate pattern in which a balance of moments acting on the container by the plurality of items is within a predetermined range and selects that candidate pattern as a final pattern, determines a predetermined order for storing the plurality of items in the container according to the final pattern, and outputs to a robot a control signal to store the plurality of items in the container according to the order.

SUMMARY

A robot system according to an aspect of the present disclosure includes circuitry and a robot, wherein the circuitry is configured to: set, based on a plurality of workpieces that move along a conveying surface, a window corresponding to n workpieces of the plurality of workpieces, according to an inflow order that is an order in which the plurality of workpieces have moved along the conveying surface, where n>1; determine a picking order for the window by an optimization algorithm, based on a position of each of the n workpieces on the conveying surface, the picking order being an order of picking one or more of the workpieces from the conveying surface and being different from the inflow order; and select m workpieces from the window based on the picking order, where n>m, and wherein the robot is configured to pick the selected m workpieces from the conveying surface in the picking order.

A robot control method according to an aspect of the present disclosure is executable by a robot control system including at least one processor. The method includes: setting, based on a plurality of workpieces that move along a conveying surface, a window corresponding to n workpieces of the plurality of workpieces, according to an inflow order that is an order in which the plurality of workpieces have moved along the conveying surface, where n>1; determining a picking order for the window by an optimization algorithm, based on a position of each of the n workpieces on the conveying surface, the picking order being an order of picking one or more of the workpieces from the conveying surface and being different from the inflow order; selecting m workpieces from the window based on the picking order, where n>m; and controlling a robot to pick the selected m workpieces from the conveying surface in the picking order.

Anon-transitory computer-readable storage medium according to an aspect of the present disclosure stores processor-executable instructions to: set, based on a plurality of workpieces that move along a conveying surface, a window corresponding to n workpieces of the plurality of workpieces, according to an inflow order that is an order in which the plurality of workpieces have moved along the conveying surface, where n>1; determine a picking order for the window by an optimization algorithm, based on a position of each of the n workpieces on the conveying surface, the picking order being an order of picking one or more of the workpieces from the conveying surface and being different from the inflow order; select m workpieces from the window based on the picking order, where n>m; and control a robot to pick the selected m workpieces from the conveying surface in the picking order.

BRIEF DESCRIPTION OF THE DRAWINGS

FIG. 7 is a diagram showing an example algorithm for determining a picking order.

FIG. 8 is a diagram showing an example update of a window.

DETAILED DESCRIPTION

In the following description, with reference to the drawings, the same reference numbers are assigned to the same components or to similar components having the same function, and overlapping description is omitted.

Overview of System

A robot system according to the present disclosure is a control system that controls a robot so as to pick (or pick up) a plurality of workpieces moving along a conveying surface one after another. For example, the robot system may cause the robot to perform a pick-and-place operation for moving the workpiece from the conveying surface to another place. The conveying surface refers to a surface on which a workpiece is placed and which moves the workpiece by being moved in a predetermined direction by a predetermined driving device. In some examples, the conveying surface is a surface of a conveyor, for example a belt of a belt conveyor or a surface realized by a set of rollers of a roller conveyor.

In some examples, the robot system manages information about workpieces on the conveying surface by adding each workpiece that has moved along the conveying surface to an array one after another. The array is a data structure for managing information about a plurality of workpieces moving along the conveying surface. In some examples, the array is a one-dimensional array and the robot system adds a plurality of workpieces to the one-dimensional array in sequence.

Based on the plurality of workpieces in the array, the robot system sets a window corresponding to n workpieces, where n>1. The window refers to a data structure for identifying n workpieces that may be picked from the conveying surface, and may also be referred to as a virtual container for the n workpieces. The robot system determines a picking order for the window, i.e., for the n workpieces, by an optimization algorithm. The picking order refers to an order of picking one or more workpieces from the conveying surface.

Based on the picking order, the robot system selects m workpieces from the window, where n>m. The robot system controls the robot to pick m workpieces from the conveying surface in the picking order. Since n>m, at least one workpiece remains in window. The robot system deletes the workpiece that is picked from the conveying surface, from the array and window.

Next, the robot system adds at least one workpiece in the array to the window, and again sets a window corresponding to n workpieces. The robot system executes the above processing on the updated window again, and controls the robot to pick new m workpieces from the conveying surface in a new picking order. The robot system repeats a series of processes including setting the window, determining the picking order, and picking m workpieces, and picks a plurality of workpieces from the conveying surface one after another. In this iteration, at least one of the values n and m may be changed between a previous loop and a next loop.

Configuration of System

Figure 1:
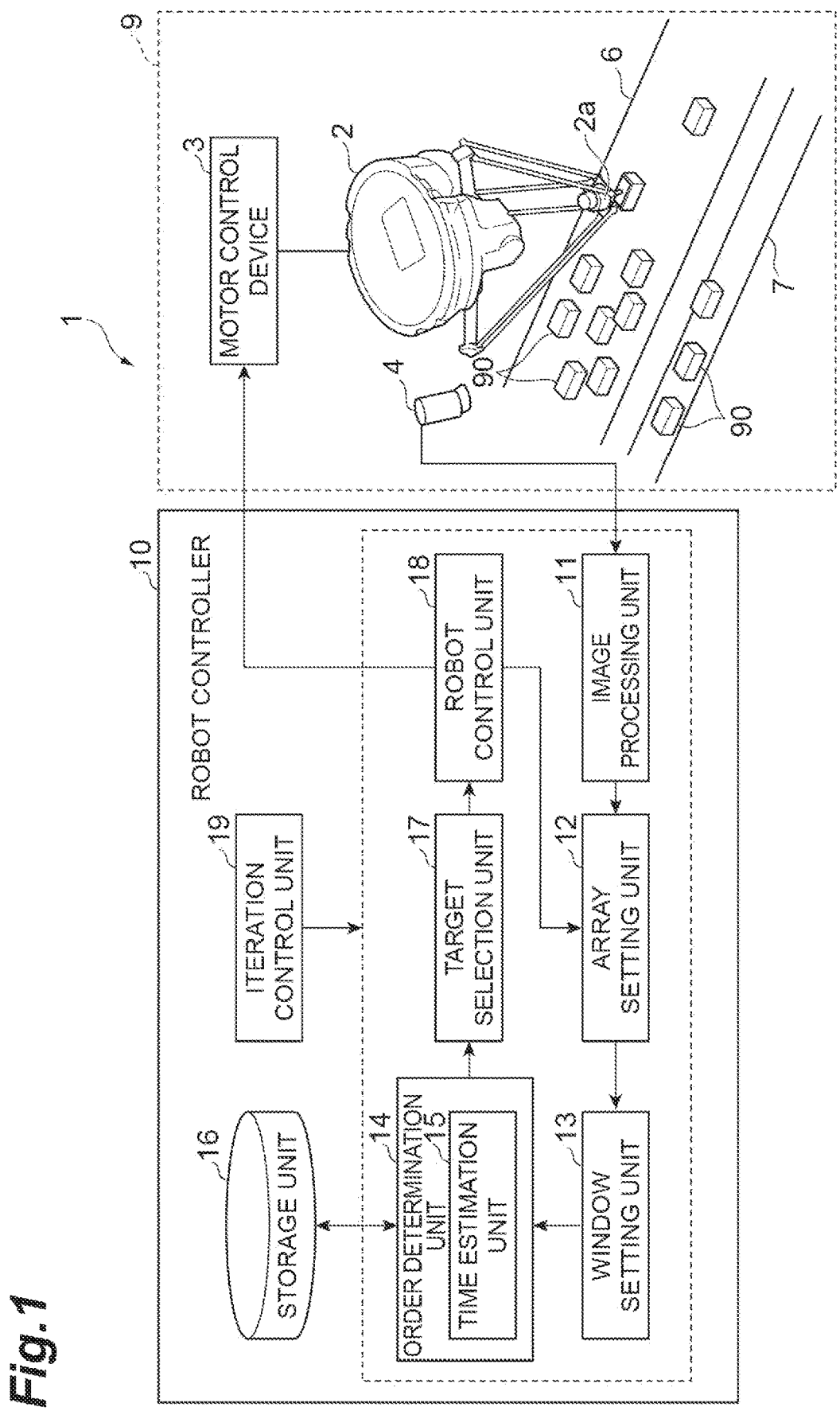
FIG. 1 is a diagram showing an example configuration of a robot system.

FIG. 1 is a diagram showing a configuration of a robot system 1 according to some examples. The robot system 1 comprises a robot 2 placed in a working space 9, a motor control device 3 that controls a motor of the robot 2, and a robot controller 10 that outputs a control signal to the motor control device 3. The working space 9 further includes a first conveyor 6 along which workpieces 90 that are to be picked by the robot 2 move, a second conveyor 7 on which the workpiece 90 picked from the first conveyor 6 is placed, and a camera 4 imaging a conveying surface of the first conveyor 6. The robot controller 10 connects to each of the motor control device 3 and the camera 4 via a communication network. The communication network connecting the devices may be a wired network or a wireless network. The communication network may include at least one of the Internet and an intranet. Alternatively, the communication network may be implemented by one communication cable.

The robot 2 is a device that receives a power and executes a predetermined operation according to a purpose to perform useful work. In some examples, the robot 2 comprises a plurality of joints and is configured to be able to perform various processes while holding an end effector 2a in the tip portion. The joint is an example of a driven object. A joint axis is set for each of the plurality of joints. Some components of the robot 2, such as arms, pivots, etc., rotate about the joint axis so that the robot 2 is able to freely change the position and posture of the tip portion within a predetermined range. In some examples, the robot 2 is a vertical articulated robot of a multi-axis serial link type. The robot 2 may be a six-axis vertical articulated robot, or a seven-axis vertical articulated robot in which one redundant axis is added to six axes. Alternatively, the robot 2 may be a parallel link robot that operates according to a parallel link mechanism. The robot 2 may be a movable robot, for example a robot supported by automated guided vehicles (AGV). Alternatively, the robot 2 may be a stationary robot that is fixed in a predetermined place.

The end effector 2a is a device that acts on the workpiece 90, for example, a device that gives some physical change to the workpiece 90. The end effector 2a may be various devices such as a gripper, a suction end, a polishing tool, a welding gun, a press machine, a sealing nozzle, a screwing device, etc.

The motor is a device that generates a power for driving a driven object of the robot 2 in response to an electric power supplied from the motor control device 3. The individual motors operate the individual driven objects so that the robot 2 uses the end effector 2a to perform a predetermined task on the workpiece 90. The motor may be a rotary motor that rotates the driven object or a linear motor that moves the driven object along a straight line. The motor may be a synchronous motor or an induction motor. The motor may be a permanent magnet type synchronous motor such as a surface permanent magnet (SPM) motor, an interior permanent magnet (IPM) motor, etc. The motor may be a synchronous motor without a permanent magnet, such as a synchronous reluctance motor. The motor may be a DC motor or an AC motor.

The robot 2 may comprise at least one sensor that is a device for detecting a response of the robot operated by the electric power from the motor control device 3. The response refers to an output of the robot with respect to a command which is an instruction for controlling the robot. For example, the response may indicate information about at least one of a motion and a state of the robot 2. The response may indicate information about at least one of a motion and a state of the motor, for example, at least one of an axis velocity and a magnetic pole position of the motor. In a case where the motor is a rotation type, the rotation angle of the driven object by the motor corresponds to the "position", and the rotation velocity of the driven object by the motor corresponds to the "velocity". The response may indicate information about at least one of a motion and a state of the driven object, for example, at least one of a position, a velocity, and a force of the driven object. The sensor transmits a response signal indicative of the response to the robot controller 10. The response may be a value itself obtained by the sensor or may be represented by a value calculated or processed by a predetermined calculation or algorithm. Examples of the sensor may include a rotary encoder that outputs a pulse signal having a frequency proportional to a motion velocity of the motor. The rotary encoder is capable of obtaining both the position and velocity of the motor.

The motor control device 3 is a device for making the output of the motor follow the control signal (i.e., command) from the robot controller 10. The motor control device 3 generates an electric power for moving the motor based on the control signal from the robot controller 10 and supplies the electric power to the motor. The supplied electric power corresponds to a driving force command such as a torque command, a current command, or the like. The motor control device 3 may be, for example, an inverter or a servo amplifier. The motor control device 3 may be incorporated into the robot 2. The motor control device 3 may include a sensor that detects a response of the motor control device 3.

The camera 4 is a device that images the conveying surface of the first conveyor 6, and is an example of a sensor that monitors the conveying surface. In some examples, the camera 4 images the conveying surface and continuously transmits image data to the robot controller 10, while one or more workpieces 90 are moving along the first conveyor 6. The image data is, for example, video data constituted by a plurality of frames.

Each of the first conveyor 6 and the second conveyor 7 is a conveying device that moves a plurality of workpieces 90 in a predetermined direction. The conveying surfaces of both conveyors have a moving direction that is a direction in which the plurality of workpieces 90 move, and a width direction orthogonal to the moving direction. The first conveyor 6 is wide enough to allow two or more of the workpieces 90 to move in parallel. In the first conveyor 6, a plurality of workpieces 90 move along the conveying surface in a state of being randomly arranged in at least one of the moving direction and the width direction. That is, in the first conveyor 6, the plurality of workpieces 90 move along the conveying surface in a state of being randomly placed in the moving direction and the width direction. Part of the plurality of workpieces 90 may move while rotating on the first conveyor 6, which is one example of the random arrangement. For example, the plurality of workpieces 90 move along the conveying surface of the first conveyor 6 in a manner in which at least one of the position and the orientation of each workpiece 90 is randomly set. On the other hand, the width of the second conveyor 7 corresponds to the size of the workpiece 90. Therefore, in the second conveyor 7, a plurality of workpieces 90 move one by one along the conveying surface.

In some examples, the first conveyor 6 constitutes a path for circulating the workpieces 90, and the robot 2 picks m workpieces 90 in a predetermined picking area of the first conveyor 6. Even if a certain workpiece 90 has not been picked in the picking area, that workpiece 90 may be returned to the picking area and then picked by the robot 2.

Although FIG. 1 shows one robot 2 and one robot controller 10, the robot system 1 may include more than one robot 2 or more than one robot controller 10. One robot controller 10 may be connected to a plurality of robot 2. There may be more than one first conveyor 6 and more than one camera 4 or there may be more than one second conveyor 7.

The robot controller 10 is a device that generates a command for operating the robot 2 and outputs a control signal based on the command. The robot controller 10 is an example of the robot control system and the workpiece management system. In some examples, the robot controller 10 includes an image processing unit 11, an array setting unit 12, a window setting unit 13, an order determination unit 14, a time estimation unit 15, a storage unit 16, a target selection unit 17, a robot control unit 18, and an iteration control unit 19, as functional modules. The image processing unit 11 is a functional module that extracts the workpiece 90 from the image data received from the camera 4. The array setting unit 12 is a functional module that sets an array indicating one or more workpieces 90 based on the extracted workpiece 90 and the result of robot control. The window setting unit 13 is a functional module that sets a window corresponding to n workpieces 90 based on the array. The order determination unit 14 is a functional module that determines a picking order with respect to the window by an optimization algorithm. The time estimation unit 15 is a functional module that estimates, for each of the n workpieces 90, a required time for picking the workpiece 90 from the conveying surface. The time estimation unit 15 functions as part of the order determination unit 14 and the required time is used to determine the picking order. The storage unit 16 is a functional module that stores a data table used to estimate the required time. The target selection unit 17 is a functional module that selects, as target workpieces, m workpieces from the window based on the determined picking order, where n>m. The robot control unit 18 is a functional module that controls the robot 2 to pick the m workpieces 90 from the conveying surface of the first conveyor 6 in the picking order and place the m workpieces 90 on the conveying surface of the second conveyor 7. The iteration control unit 19 is a functional module that causes the robot 2 to repeatedly perform picking n workpieces 90.

Figure 2:
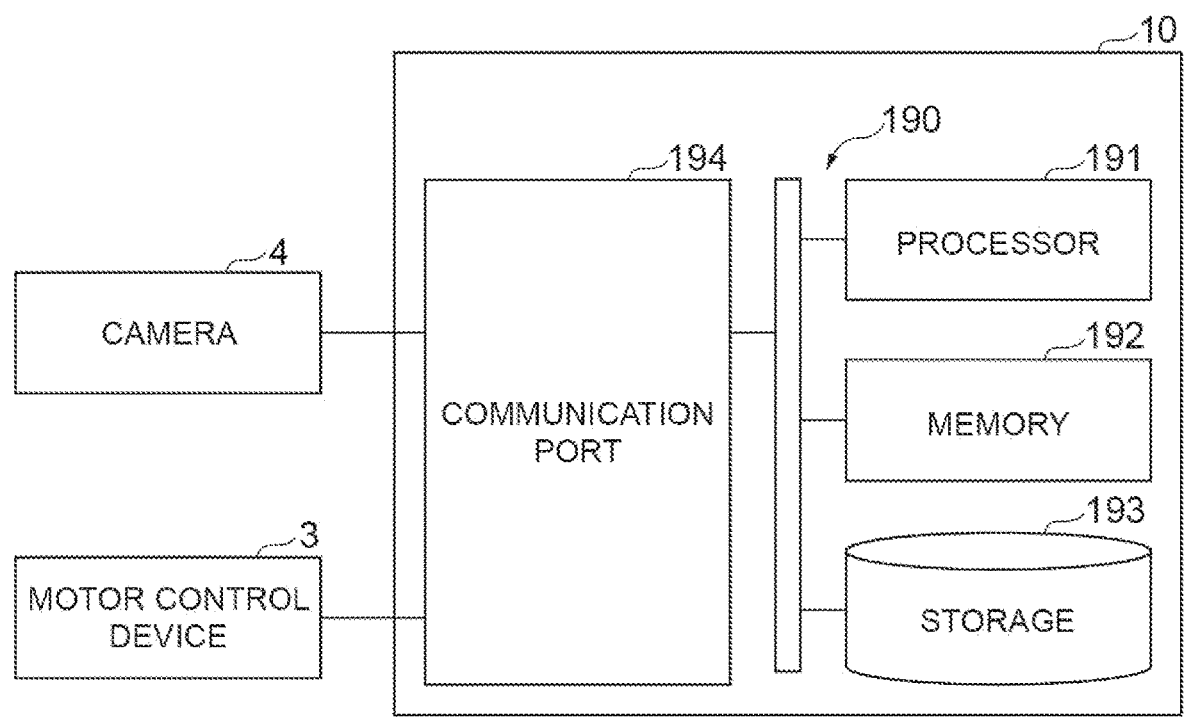
FIG. 2 is a diagram showing an example hardware configuration of a robot controller.

FIG. 2 is a diagram showing an example hardware configuration of the robot controller 10. The robot controller 10 includes circuitry 190. In some examples, the circuitry 190 comprises at least one processor 191, a memory 192, a storage 193, and at least one communication port 194. The storage 193 is a non-volatile storage medium and stores a program for realizing each functional module described above. The storage 193 may be configured by, for example, at least one hard disk or nonvolatile memory. The memory 192 temporarily stores a program loaded from the storage 193, a calculation result by the processor 191, and the like. The memory 192 may be configured by, for example, at least one random access memory. The processor 191 executes the program in cooperation with the memory 192 to configure each functional module. The communication port 194 executes data communication with another device according to a command from the processor 191. For example, the robot controller 10 includes one communication port 194 for transmitting and receiving data signals to and from the camera 4 and another communication port 194 for transmitting and receiving data signals to and from the motor control device 3.

Each functional module of the robot controller 10 is implemented by reading a robot control program on the processor 191 or the memory 192 and causing the processor 191 to execute the program. The robot control program includes a code for implementing each functional module of the robot controller 10. The processor 191 operates the communication port 194 according to the robot control program, and reads and writes data in the memory 192 or the storage 193.

The robot control program may be provided after being fixedly recorded in a non-transitory recording medium such as a CD-ROM, a DVD-ROM, or a semiconductor memory. Alternatively, the robot control program may be provided as data signal superimposed on a carrier through a communication network.

In some examples, the robot control program includes a workpiece management system that sets the window, determines the picking order, and selects the target workpiece. The workpiece management system may be provided independently. In some examples, the workpiece management system is implemented by a workpiece management program.

Robot Control Method

Figure 3:
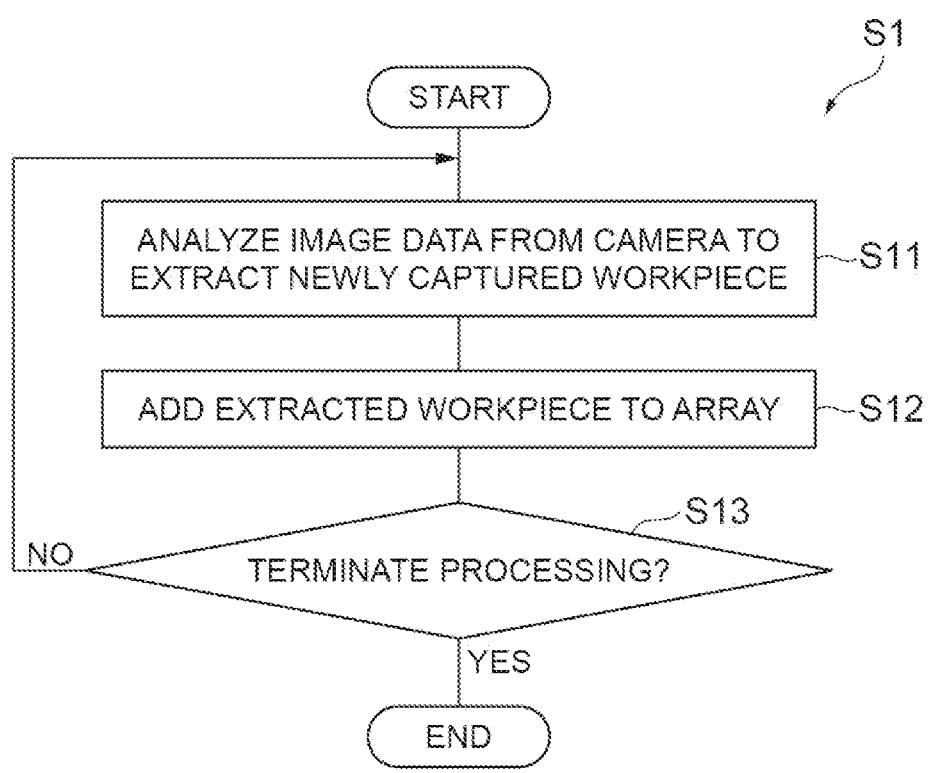
FIG. 3 is a flowchart showing an example process for adding a workpiece to an array.
Figure 4:
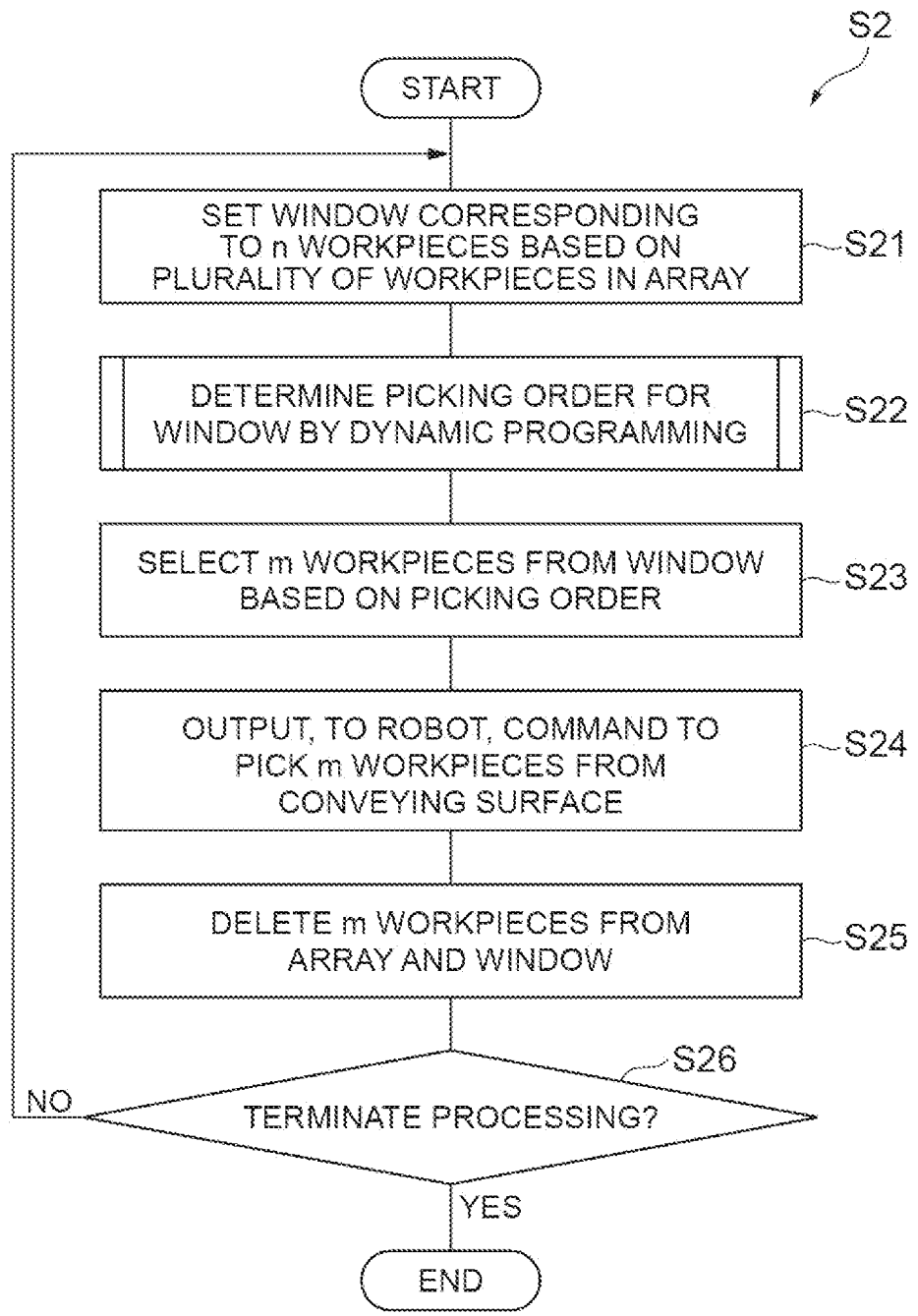
FIG. 4 is a flowchart showing an example robot control based on an array.
Figure 5:
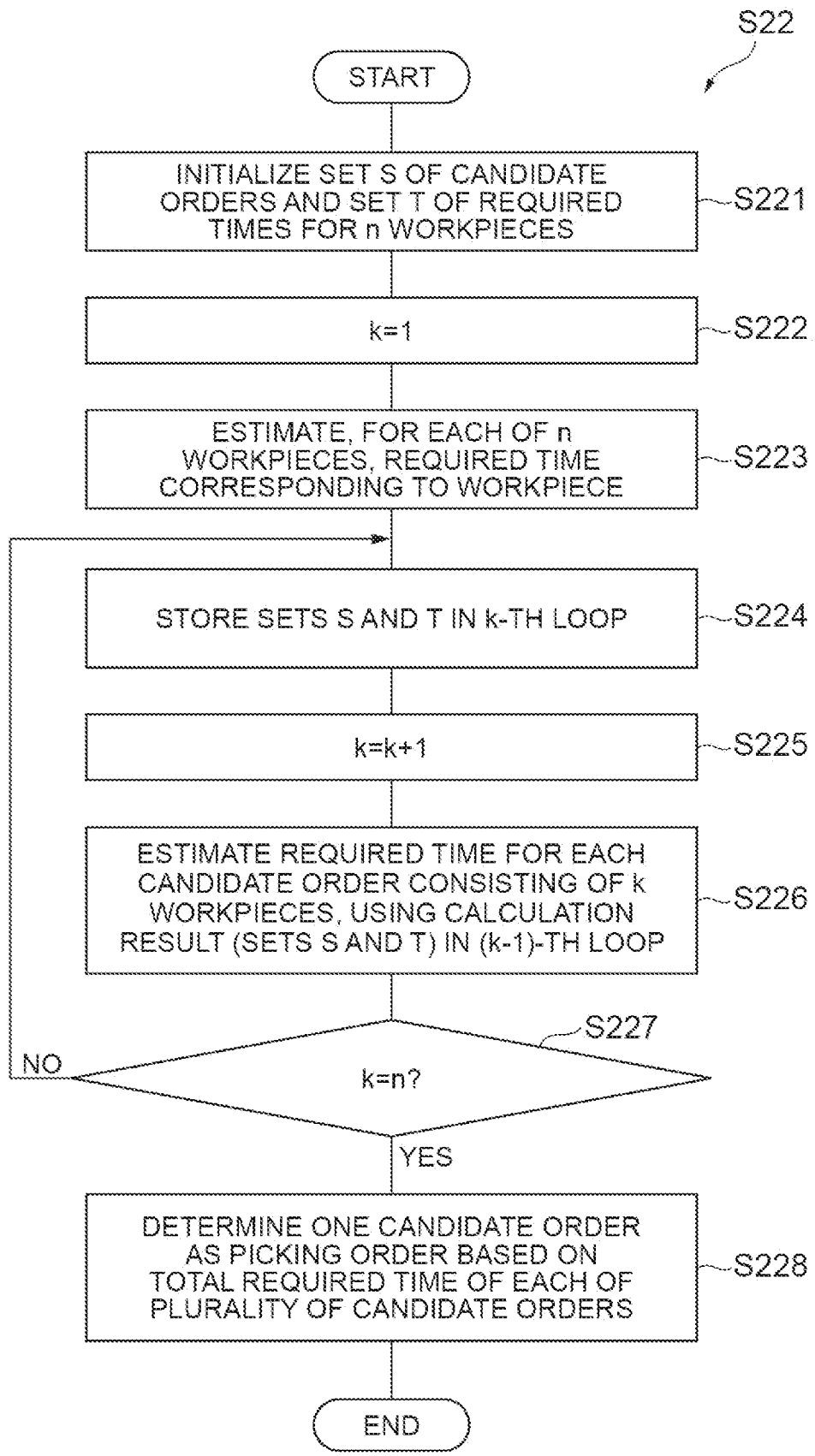
FIG. 5 is a flowchart showing an example process for determining a picking order.

As one example of the robot control method according to the present disclosure, an example processing procedure executed by the robot controller 10 will be described with reference to FIGS. 3 to 5. FIG. 3 is a flowchart showing an example process for adding a workpiece to an array, as a processing flow S1. FIG. 4 is a flowchart showing an example robot control based on the array as a processing flow S2. FIG. 5 is a flowchart showing an example process for determining a picking order. The robot controller 10 executes the processing flow S1 with respect to adding a workpiece to the array and executes the processing flow S2 with respect to the robot control.

Addition of Workpiece to Array

An example process for adding a workpiece to the array will be described with reference to FIG. 3. In some examples, the robot controller 10 initiates the processing flow S1 in response to receiving a predetermined request from a user or host controller.

In step S11, the image processing unit 11 receives image data from the camera 4 and analyzes the image data to extract a newly captured workpiece 90. For example, the image processing unit 11 executes object detection on the image data to extract the workpiece 90, and calculates a position of the extracted workpiece 90 on the conveying surface. The position may be represented by, for example, an X coordinate and a Y coordinate, may be represented by an X coordinate, a Y coordinate, and a Z coordinate, or may further include rotation about a Z axis. The "newly captured workpiece" refers to a workpiece that has moved along the conveying surface and entered an imaging range of the camera 4. In a single step S11, the image processing unit 11 may extract a plurality of new workpieces 90.

In step S12, the array setting unit 12 adds the extracted workpiece 90 to an array. For example, the array setting unit 12 records a combination of a workpiece ID, which is an identifier that uniquely identifies the workpiece 90, and the position of the workpiece 90 on the conveying surface in the array, as the addition of the workpiece 90 to the array. In some examples, the array setting unit 12 adds the extracted one or more workpieces 90 to the array in an order in which the one or more workpieces 90 are captured by the camera 4, i.e. in the inflow order, which is an order in which the one or more workpieces 90 have moved along the conveying surface. That is, the "order in which one or more workpieces are captured by the camera" is an example of the order in which the workpieces are detected by a sensor. The array setting unit 12 may set the order in which the workpieces are detected by the sensor, as the inflow order.

As shown in step S13, the steps S11 and S12 may be repeatedly executed while the robot system 1 performs a pick-and-place operation.

Robot Control

An example robot control based on the array will be described with reference to FIGS. 4 and 5. In some examples, the robot controller 10 initiates the processing flow S2 in response to receiving a predetermined request from a user or host controller.

In step S21, the window setting unit 13 sets a window corresponding to n workpieces 90 based on a plurality of workpieces 90 in the array. In some examples, the window setting unit 13 selects n workpieces 90 from the head of the array and sets the window for the selected workpieces 90. Thus, adding the workpieces 90 to the array and setting the window may be a process like first in first out (FIFO). In some examples, one or more workpieces 90 are added to the array in the order in which these workpieces 90 is captured by the camera 4, i.e., the inflow order, and the window setting unit 13 selects n workpieces 90 based on that order. The window setting unit 13 may set an order in which the workpieces are detected by the sensor, as the inflow order, and set the window corresponding to the n workpieces, according to the inflow order. Since n denotes an integer equal to or greater than 2, the set window indicates a plurality of workpieces 90. Since the array indicates the plurality of workpieces 90 that move along the conveying surface, it may be said that the window setting unit 13 sets the window based on the plurality of workpieces 90 that move along the conveying surface. As described above with respect to the first conveyor 6, in some examples, the window setting unit 13 sets the window based on a plurality of workpieces 90 that move along the conveying surface in a state of being randomly arranged state in at least one of the moving direction and the width direction.

In step S22, the order determination unit 14 determines a picking order for the set window by dynamic programming, based on the position of each of n workpieces 90 indicated by the window. The picking order may be different from the inflow order. The dynamic programming is an example of the optimization algorithm. The dynamic programming is a technique of dividing a target problem into a plurality of partial problems and finding a final solution while recording calculation results of the partial problems. Since the dynamic programming uses the calculation results of the partial problems, it is not necessary to repeat the same calculation, and the entire calculation time may be shortened accordingly. An example processing for determining the picking order by the dynamic programming will be described with reference to FIG. 5.

In step S221, the order determination unit 14 initializes a set S of candidate orders and a set T of required times for the n workpieces 90. At this stage, both the sets S and T are empty set. The candidate order refers to a candidate of the picking order. Each required time indicates a time for picking one or more workpieces 90 according to the candidate order. The n workpieces 90 are hereinafter distinguished as $W_1, W_2, \ldots, W_n$.

In step S222, the order determination unit 14 sets a variable k for managing repetitive processing the in dynamic programming to 1.

In step S223, the time estimation unit 15 estimates, for each of the n workpieces 90, the required time corresponding to the workpiece 90 based on the position of the workpiece 90. Hereinafter, the "required time for picking the workpiece" is also simply referred to as "required time for the workpiece". Each candidate order is defined by k workpieces 90. Since k=1 at this stage, each of n candidate orders indicates a single workpiece 90, and the set S of candidate orders is represented as $[S\{W_1\}, S\{W_2\}, \ldots, S\{W_n\}]$. Assuming that required times of the candidate orders $S\{W_1\}, S\{W_2\}, \ldots, S\{W_n\}$ are denoted by $T(W_1), T(W_2), \ldots, T(W_n)$, respectively, the time estimation unit 15 sets $[T(W_1), T(W_2), \ldots, T(W_n)]$ as the set T of required times.

In some examples, the time estimation unit 15 estimates the required time based on a data table in the storage unit 16. The data table is a data structure indicating a required time at each of a plurality of sample points on the conveying surface caught by the camera 4. That is, the data table indicates a distribution of the required times on the conveying surface. The data table is manually or automatically stored in the storage unit 16 before the processing flow S2 is executed. The data table may be prepared based on a time measured by actually operating the robot 2, or may be prepared based on a time measured by virtually operating the robot 2 by computer simulation.

Figure 6:
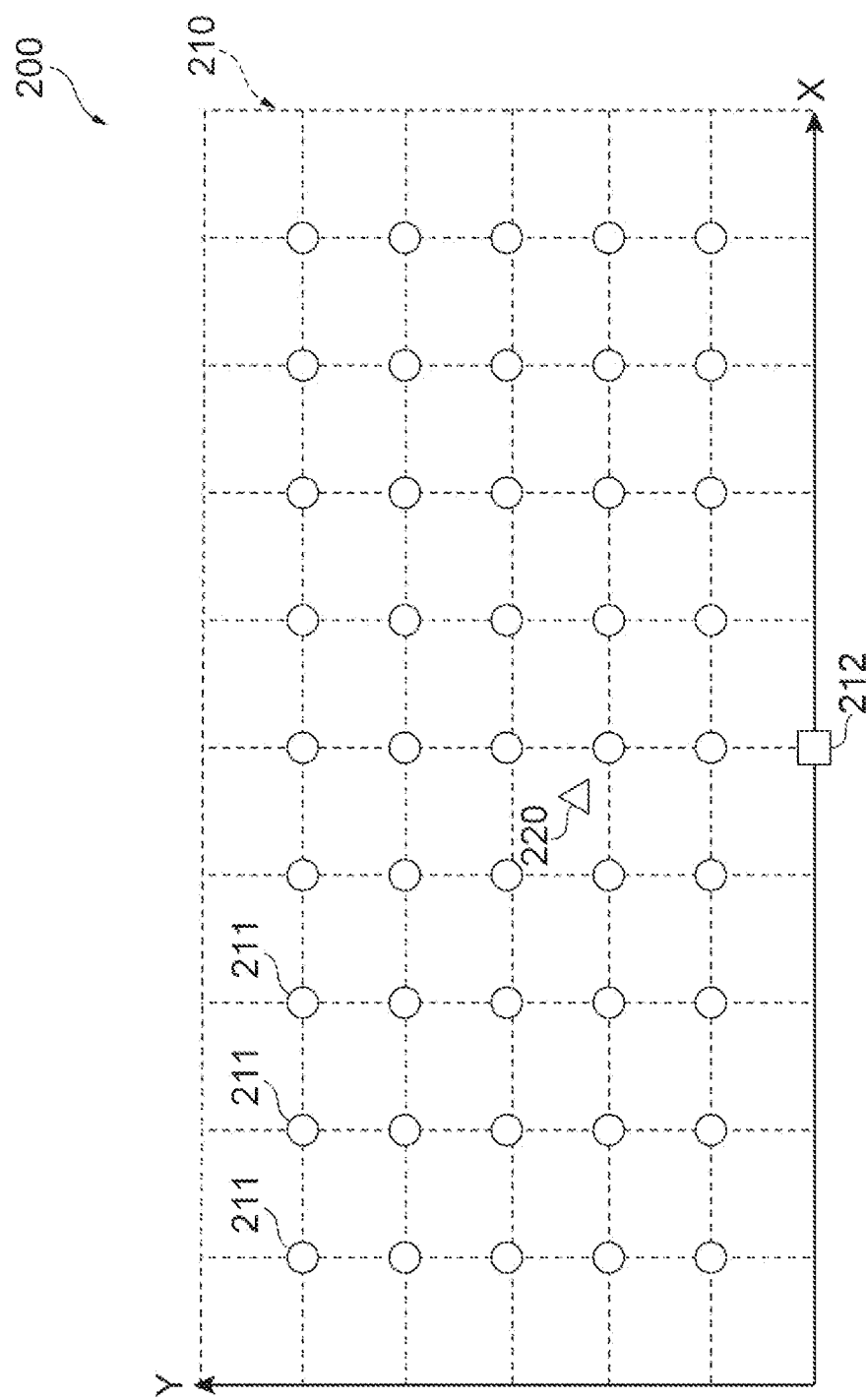
FIG. 6 is a diagram for explaining a concept of a data table.

FIG. 6 is a diagram for explaining a concept of the data table. A data table 200 in the example of FIG. 6 indicates a required time at each of a plurality of sample points 211 set on a conveying surface 210 captured by the camera 4. The conveying surface 210 is represented by an XY plane, and each the sample point 211 is represented by an X coordinate and a Y coordinate. In this example, the robot 2 moves each of the plurality of workpieces 90 to a reference position 212, which is a common designated place. It should be noted that the common designated place is not limited to a specific point, and may be a region having a two-dimensional spread, such as an internal space of one container. The data table 200 indicates, for each sample point 211, the required time for picking the workpiece 90 located at the sample point 211. In some examples, the required time may be based on a round-trip travelling time of the robot 2 at a distance from the reference position 212 to the sample point 211, a picking time for the robot 2 to pick the workpiece 90 at the sample point 211, and a placing time for the robot 2 to place the workpiece 90 at the reference position 212. For example, the required time may be a sum of the round-trip travelling time, the picking time, and the placing time.

In the example of FIG. 6, the time estimation unit 15 refers to the data table 200, and estimates the required time for moving the workpiece 90 from the conveying surface to the reference position 212 for each of the n workpieces 90. In a case where a position of a certain workpiece $W_i$ is the same as the sample point 211, the time estimation unit 15 estimates the required time corresponding to the sample point 211 as the required time for the workpiece $W_i$. As a position 220 in FIG. 6, the position of the workpiece $W_i$ may be different for any sample point 211. In this case, the time estimation unit 15 may execute interpolation based on the estimated time of at least one sample point 211 that locates in the vicinity of that position to estimate the required time for the workpiece $W_i$. Alternatively, the time estimation unit 15 may estimate an estimated time corresponding to the sample point 211 located closest to the workpiece $W_i$, as the required time for the workpiece $W_i$.

The time estimation unit 15 may calculate the round-trip travelling time at a distance from the reference position 212 to the position of the workpiece 90 based on that distance and the velocity of the robot 2, and estimate the required time based on the round-trip travelling time, without using the data table. For example, the time estimation unit 15 may estimate the required time based on the round-trip travelling time, a picking time for the robot 2 to pick the workpiece 90 at a destination, and a placing time for the robot 2 to place the workpiece 90 at the reference position 212. The time estimation unit 15 may estimate a sum of the round-trip travelling time, the picking time, and the placing time as the required time.

Referring back to FIG. 5, in step S224, the time estimation unit 15 generates or stores the set S of candidate orders and the set T of required times in the k-th loop, which is the first loop in a case where step S224 follows step S223. These sets S and T are used in the next iterative process.

In step S225, the order determination unit 14 increments the variable k. The update of variable k causes the dynamic programming to proceed to the next iterative process.

In step S226, the time estimation unit 15 estimates the required time for each candidate order consisting of k workpieces, using the sets S and T obtained in the (k−1)-th loop. The time estimation unit 15 sets the sets S and T to be used in the next iterative process based on the estimation result.

As shown in step S227, the order determination unit 14 and the time estimation unit 15 repeat processing from step S224 to S226 until the required time is estimated for each candidate order consisting of n workpieces 90. That is, the time estimation unit 15 estimates the required time for each candidate order in a case where the workpiece 90 is added by one, using the sets S and T stored in the previous iteration process (step S226), and stores the sets S and T to be used in the next iteration process based on the estimation result (step S224). The time estimation unit 15 estimates the required time for each candidate order in a case where the workpiece 90 is further added by one, using the stored sets S and T in the next iteration (steps S225 and S226). Based on the estimation result, the time estimation unit 15 stores the sets S and T to be used in the next iteration (step S224).

In step S228, the order determination unit 14 determines one candidate order as the picking order based on a total required time of each of the plurality of candidate orders obtained in the last iteration, that is, the n-th loop process. The total required time refers to a time required to extract the n workpieces 90 from the conveying surface in sequence, and is indicated by the set T obtained in the last iteration. In some examples, the order determination unit 14 determines the candidate order with the smallest total required time, as the picking order.

As described above, the order determination unit 14 and the time estimation unit 15 execute the dynamic programming based on the required time for each of the n workpieces 90 to determine the picking order.

An example implementation of step S22 will be described with reference to FIG. 7. FIG. 7 is a diagram showing an example algorithm for determining the picking order. In order to simplify the description, in the example of FIG. 7, under the assumption that the window indicates three workpieces A, B, and C, the algorithm 300 for determining the picking order of the three workpieces is described for each code block.

In this example, the positions of the workpieces A, B, and C are represented by $(x_A, y_A)$, $(x_B, y_B)$, and $(x_C, y_C)$, respectively. The function GetPickAndPlaceTime called in the algorithm 300 receives a position related to one designated workpiece as an argument and calculates the required time for the workpiece. As described above, the function GetPickAndPlaceTime may calculate the required time with reference to the data table or may calculate the required time without referring to the data table.

In a code block 301, the order determination unit 14 initializes the set S of candidate orders and the set T of required times. The code block 301 corresponds to step S221.

In a code block 302, the time estimation unit 15 estimates, for each of the workpieces A, B, and C, the required time for the workpiece based on the position of the workpiece. The time estimation unit 15 calculates a required time T[{A}] corresponding to a candidate order S[{A}], a required time T[{B}] corresponding to a candidate order S[{B}], and a required time T[{C}] corresponding to a candidate order S[{C}]. The time estimation unit 15 stores these candidate orders and required times. The code block 302 corresponds to steps S222 to S224.

In a code block 303, the time estimation unit 15 estimates the required time for each candidate order consisting of two workpieces. For a combination of the workpieces A and B, the time estimation unit 15 calculates a required time for a candidate order [A→B] and a required time for a candidate order [B→A]. In this calculation, the candidate orders and required times stored in the code block 302 are used. In the code block 303, the required time of the first workpiece is taken into account when calculating the required time of the second workpiece by the function GetPickAndPlaceTime. The time estimation unit 15 stores a minimum of the calculated two required times, as a required time T[{A, B}] for the combination of the workpieces A and B. The time estimation unit 15 also stores a candidate order S[{A, B}] corresponding to the required time T[{A, B}]. The candidate order S[{A,B}] is one of [A→B] and [B→A]. The time estimation unit 15 executes the same processing for a combination of the workpieces A and C and a combination of the workpieces B and C as for the combination of the workpieces A and B. The code block 303 corresponds to steps S225, S226, and S224.

In a code block 304, the time estimation unit 15 estimates the required time for each candidate order consisting of three workpieces. The time estimation unit 15 calculates a required time for a candidate order $[S[\{A, B\}] \to C]$, a required time for a candidate order $[S[\{A, C\}] \to B]$, and a required time for a candidate order $[S[\{B, C\}] \to A]$. In this calculation, the candidate orders and required times stored in the code block 303 are used. In the code block 304, the required times for the first and second workpieces are taken into account when calculating the required time for the third workpiece by the function GetPickAndPlaceTime. The time estimation unit 15 acquires a minimum of the calculated three required times as a required time $T[\{A, B, C\}]$ for the combination of the workpieces A, B, and C. The order determination unit 14 determines a candidate order $S[\{A, B, C\}]$ corresponding to the required time $T[\{A, B, C\}]$ as the picking order. The candidate order $S[\{A, B, C\}]$ is any one of six possible candidate orders. The code block 304 corresponds to steps S225, S226, and S228.

In the following, the algorithm 300 is generalized and the processing of steps S224 to S228 will be described in cases of k=2, k=3, and k=n.

Case where k=2

The time estimation unit 15 estimates the required time for each of two candidate orders $[W_i \to W_j]$ and $[W_j \to W_i]$, for each combination of two workpieces $W_i$ and $W_j$, where i≠j). It is assumed that the required times corresponding to the candidate orders $S\{W_i\}$ and $S\{W_j\}$ are denoted by $T(W_i)$ and $T(W_j)$, respectively.

Regarding the candidate order $[W_i \to W_j]$, the time estimation unit 15 estimates a sum of a time $T(W_i)$ to pick the workpiece $W_i$ and a time $T(W_j)'$ to subsequently pick the workpiece $W_j$, as the required time. In some examples, the time estimation unit 15 calculates the time $T(W_j)'$ based on the required time $T(W_i)$.

Regarding the candidate order $[W_j \to W_i]$, the time estimation unit 15 estimates a sum of a time $T(W_j)$ to pick the workpiece $W_j$ and a time $T(W_i)'$ to subsequently pick the workpiece $W_i$, as the required time. In some examples, the time estimation unit 15 calculates the time $T(W_i)'$ based on the required time $T(W_j)$.

The time estimation unit 15 stores a minimum of the calculated two required times as $T(W_i, W_j)$, and stores a candidate order corresponding to the minimum as a candidate order $S\{W_i, W_j\}$ of the two workpieces $W_i$ and $W_j$.

Case where k=3

The time estimation unit 15 estimates the required time for each of three candidate orders $[S\{W_i, W_j\} \to W_k]$, $[S\{W_j, W_k\} \to W_i]$, and $[S\{W_i, W_k\} \to W_j]$, for each combination of three workpieces $W_i$, $W_j$, and $W_k$, where i, j, and k are different from each other). It is assumed that the required times corresponding to the candidate orders $S\{W_i, W_j\}$, $S\{W_j, W_k\}$, and $S\{W_i, W_k\}$ are denoted by $T(W_i, W_j)$, $T(W_j, W_k)$, and $T(W_i, W_k)$, respectively. By referring to results stored in the previous loop, it is sufficient for the time estimation unit 15 to estimate the required time for these three candidate orders, and does not need to estimate the required times for all the six possible candidate orders.

Regarding the candidate order $[S\{W_i, W_j\} \to W_k]$, the time estimation unit 15 estimates a sum of the required time $T(W_i, W_j)$ corresponding to the candidate order $S\{W_i, W_j\}$ and a time $T_k'$ to subsequently pick the workpiece $W_k$, as the required time. In some examples, the time estimation unit 15 calculates the time $T_k'$ based on the time $T(W_i, W_j)$.

Regarding the candidate order $[S\{W_j, W_k\} \to W_i]$, the time estimation unit 15 estimates a sum of the required time $T(W_j, W_k)$ corresponding to the candidate order $S\{W_j, W_k\}$ and a time $T_i'$ to subsequently pick the workpiece $W_i$, as the required time. In some examples, the time estimation unit 15 calculates the time $T_i'$ based on the time $T(W_j, W_k)$.

Regarding the candidate order $[S\{W_i, W_k\} \to W_j]$, the time estimation unit 15 estimates a sum of the required time $T(W_i, W_k)$ corresponding to the candidate order $S\{W_i, W_k\}$ and a time $T_j'$ to subsequently pick the workpiece $W_j$, as the required time. In some examples, the time estimation unit 15 calculates the time $T_j'$ based on the time $T(W_i, W_k)$.

The time estimation unit 15 stores a minimum of the calculated three required times as $T(W_i, W_j, W_k)$ and stores a candidate order corresponding to the minimum as a candidate order $S\{W_i, W_j, W_k\}$ of the three the workpieces $W_i$, $W_j$, $W_k$.

Case where k=n

The time estimation unit 15 estimates, for each combination of n workpieces $W_1$ to $W_n$, the total required time for each n candidate orders $[S\{W_1, W_2, \ldots, W_{n-1}\} \to W_n]$, $[S\{W_2, W_3, \ldots, W_n\} \to W_1]$, $[SV\{W_1, W_3, \ldots, W_n\} \to W_2]$, ..., $[S\{W_1, W_2, \ldots, W_{n-2}, W_n\} \to W_{n-1}]$. The time estimation unit 15 executes the same calculation as for k=2, 3 to obtain n total required times. The order determination unit 14 identifies a minimum of the n total required times as $T(W_1, W_2, \ldots, W_n)$, and determines a candidate order corresponding to the minimum as a picking order $S\{W_1, W_2, \ldots, W_n\}$ for the n workpieces $W_1$-$W_n$.

As described in the cases of k=2, k=3, and k=n, in the (k−1)-th loop processing, the order determination unit 14 generates a first set of one or more candidate orders, each of which is defined by an order of (k−1) workpieces 90, and a second set of one or more physical quantities corresponding to the first set. In the k-th loop processing, the order determination unit 14 generates a third set of one or more candidate orders, each of which is defined by an order of k workpieces 90, and a fourth set of one or more physical quantities corresponding to the third set, based on the first set and the second set. In the k-th loop processing, the order determination unit 14 executes the following processing with respect to the order of k workpieces 90. That is, the order determination unit 14 generates a plurality of combinations with respect to the order of k workpieces 90 using the first set, estimates a physical quantity based on the second set for each of the plurality of combinations, selects one physical quantity from a plurality of the estimated physical quantities corresponding to the plurality of combinations, selects the order of k workpieces 90 corresponding to the selected physical quantity, from the plurality of combinations, and includes the selected order into the third set.

As shown in step S22, in some examples, the order determination unit 14 generates a plurality of candidate orders that are candidates for the picking order and a plurality of physical quantities corresponding to the plurality of candidate orders by an iterative process with n loops, and determines the picking order from the plurality of candidate orders based on the plurality of physical quantities, as at least part of the optimization algorithm or dynamic programming. The order determination unit 14 uses the physical quantity of each of the n workpieces 90 at least in the first loop of the iterative process to determine the picking order from the plurality of candidate orders.

Referring back to FIG. 4, in step S23, the target selection unit 17 selects m workpieces from the window as the target workpieces based on the determined picking order. Since n>m, the target selection unit 17 selects a part of the n workpieces corresponding to window. The target selection unit 17 selects the m workpieces in ascending order of the picking order.

In step S24, the robot control unit 18 outputs to the robot 2 a command to pick m workpieces 90 from the conveying surface. In some examples, the robot control unit 18 generates a path to pick m target workpieces from the conveying surface in order according to the picking order and place the target workpieces in the designated place. The path represents a trajectory of the robot 2, for example a trajectory of the end effector 2a. In some examples, the robot control unit 18 generates the path such that the robot 2 does not interfere with an obstacle. The interference refers to a phenomenon in which one object contacts or collides with another object. It should be noted that in a case where the robot 2 is about to process a certain workpiece 90, the contact between the robot 2 and the workpiece 90 is not the interference. The robot control unit 18 generates a series of control signals indicating the generated paths as commands, and outputs the control signals in sequence to the motor control device 3. The motor control device 3 sequentially generates the electric power for moving the motor based on the control signals and sequentially supplies the electric power to the motor. As a result, the robot 2 picks each of the m workpieces 90 from the conveying surface of the first conveyor 6 and places the m workpieces 90 on the conveying surface of the second conveyor 7, in the determined picking order.

In step S25, the array setting unit 12 deletes the picked m workpieces 90 from the array and the window.

As shown in step S26, the iteration control unit 19 causes other functional modules to repeatedly execute the processing of steps S21 to S25 every time the m workpieces 90 are picked from the conveying surface by the robot 2. The iteration control unit 19 executes the iteration until a predetermined termination condition is satisfied. The termination condition may be that a predetermined number of workpieces 90 have been picked or that all the workpiece 90 have been picked from the first conveyor 6.

In repeated step S21, the window setting unit 13 adds one or more workpieces 90 of the plurality of the workpiece 90 in the array to the window to set a new window. That is, the window setting unit 13 replaces the m workpieces 90 in the window with one or more workpieces 90 of the plurality of the workpiece 90 in the array to update the window. In step S22, the order determination unit 14 determines a next picking order for the updated window. In step S23, the target selection unit 17 selects next m workpieces 90 from the updated window based on that picking order. In step S24, the robot control unit 18 causes the robot 2 to pick the m workpieces 90 from the conveying surface in the picking order. In step S25, the array setting unit 12 deletes the m workpieces 90 from the array and the window.

FIG. 8 is a diagram showing an example of updating the window. In this example, it is assumed that the array setting unit 12 added nine extracted workpieces $W_1$ to $W_9$ to an array 400 (step S12). The window setting unit 13 sets a window 410 corresponding to three workpieces $W_1$ to $W_3$ based on the array 400 (step S21). The order determination unit 14 determines, for this the window 410, a picking order 420 indicating that workpieces $W_3$, $W_1$ and $W_2$ are picked in this order (step S22). The target selection unit 17 selects two workpieces $W_3$ and $W_1$ based on the picking order 420 (step S23) and the robot control unit 18 outputs to the robot 2 a command to pick the two workpieces from the conveying surface (step S24). In response to the robot 2 picking the workpieces $W_3$ and $W_1$ according to the command, the array setting unit 12 deletes the two workpieces from the array 400 and the window 410 (step S25). In parallel with these steps S21 to S25 or after these steps, the array setting unit 12 adds three newly extracted workpieces $W_{10}$ to $W_{12}$ to the array 400 (step S12). The window setting unit 13 adds two workpieces $W_4$ and $W_5$ to the window 410 based on the array 400 to update the window 410 (step S21). The processing of step S22 and subsequent steps are executed based on the updated window 410.

In the iteration of steps S21 to S25, the window setting unit 13 may change the size of the window, that is, the number n of the workpieces 90 corresponding to the window. Corresponding to the case in which the size of the window is variable, the number m of the target workpieces selected by the target selection unit 17 may also be variable.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail.

At least some of the functional modules associated with the robot system, robot control system, or workpiece management system may be implemented in one or more other devices, such as the motor control device.

The robot system, robot control system, or workpiece management system may execute the optimization algorithm based on a position of each of the plurality of workpieces that move along the conveying surface without setting the window, to determine the picking order for the plurality of workpieces.

In the above examples, the order determination unit 14 executes the optimization algorithm based on the required time for picking the workpiece to determine the picking order. The order determination unit may however determine the picking order using a physical quantity other than the required time. For example, the order determination unit may execute the optimization algorithm based on a travel distance or energy consumption (e.g., electric power consumption) of the robot to determine the picking order. In this example, the order determination unit may refer to the data table indicating a distribution of physical quantities other than the required time to acquire the physical quantity based on the position of each of the n workpieces corresponding to the window.

The examples of FIGS. 6 and 7 assume that the plurality of workpieces are to be placed in the common designated place. However, the position where the workpiece picked from the conveying surface is to be placed may not be unified. That is, the robot may move, for each of the m target workpieces, the target workpiece to a designated place corresponding to the target workpiece. In this example, the order determination unit estimates, for each of the n workpieces corresponding to the window, a physical quantity for moving the workpiece from the conveying surface to the candidate place for each of a plurality of candidate places that are candidates of the designated place. The order determination unit then determines the designated place for each workpiece based on the physical quantity. For example, the order determination unit determines, for each of the n workpieces, the designated place in which the total physical quantity for picking the n workpieces is minimized. The order determination unit then determines the picking order based on n total physical quantities corresponding to the n workpieces for which the designated place is determined.

The hardware configuration of the system is not limited to examples in which each functional module is implemented by executing a program. For example, at least part of the functional modules described above may be configured by a logic circuit specialized for the function, or by an application specific integrated circuit (ASIC) in which the logic circuit is integrated.

The procedure of the method executed by at least one processor may be different from the above examples. For example, some of the steps or processes described above may be omitted, or the steps may be executed in a different order. Further, any two or more steps among the above-described steps may be combined, or part of steps may be modified or deleted. Alternatively, another step may be executed in addition to the above-described steps.

In a case where the magnitude relationship between two numerical values is compared in the computer system or the computer, either of two criteria of "equal to or greater than" and "greater than" may be used, and either of two criteria of "equal to or less than" and "less than" may be used.

As described above, a robot system according to an aspect of the present disclosure includes circuitry and a robot, wherein the circuitry is configured to: set, based on a plurality of workpieces that move along a conveying surface, a window corresponding to n workpieces of the plurality of workpieces, according to an inflow order that is an order in which the plurality of workpieces have moved along the conveying surface, where n>1; determine a picking order for the window by an optimization algorithm, based on a position of each of the n workpieces on the conveying surface, the picking order being an order of picking one or more of the workpieces from the conveying surface and being different from the inflow order; and select m workpieces from the window based on the picking order, where n>m, and wherein the robot is configured to pick the selected m workpieces from the conveying surface in the picking order.

A robot control method according to an aspect of the present disclosure is executable by a robot control system including at least one processor. The method includes: setting, based on a plurality of workpieces that move along a conveying surface, a window corresponding to n workpieces of the plurality of workpieces, according to an inflow order that is an order in which the plurality of workpieces have moved along the conveying surface, where n>1; determining a picking order for the window by an optimization algorithm, based on a position of each of the n workpieces on the conveying surface, the picking order being an order of picking one or more of the workpieces from the conveying surface and being different from the inflow order; selecting m workpieces from the window based on the picking order, where n>m; and controlling a robot to pick the selected m workpieces from the conveying surface in the picking order.

Anon-transitory computer-readable storage medium according to an aspect of the present disclosure stores processor-executable instructions to: set, based on a plurality of workpieces that move along a conveying surface, a window corresponding to n workpieces of the plurality of workpieces, according to an inflow order that is an order in which the plurality of workpieces have moved along the conveying surface, where n>1; determine a picking order for the window by an optimization algorithm, based on a position of each of the n workpieces on the conveying surface, the picking order being an order of picking one or more of the workpieces from the conveying surface and being different from the inflow order; select m workpieces from the window based on the picking order, where n>m; and control a robot to pick the selected m workpieces from the conveying surface in the picking order.

In some aspects, the picking order of two or more workpieces corresponding to the window is determined by the optimization algorithm, and part of the two or more workpieces are picked in that order. This series of processes allows the workpieces to be efficiently picked.

In some examples, the circuitry may be configured to, each time the m workpieces are picked from the conveying surface by the robot: replace the m workpieces in the window with one or more workpieces of the plurality of workpieces to update the window; determine a next picking order for the updated window; select next m workpieces from the updated window based on the next picking order; and cause the robot to pick the next m workpieces from the conveying surface in the next picking order. Since the series of processes from the setting of the window to the picking of the workpieces is repeatedly executed while using the optimization algorithm, in accordance with the situation of the plurality of workpieces moving along the conveying surface, the workpieces coming one after another may be efficiently picked. Picking all the n workpieces corresponding to the window amounts to finding a local solution. By leaving some workpieces in the window and executing the optimization algorithm again based on a set of the remaining workpiece and a new workpiece, the workpieces may be efficiently picked in consideration of the plurality of workpieces on the conveying surface more comprehensively. For example, a first workpiece left in the window may have a lower priority of picking than a new second workpiece having added to the window. In this case, the overall efficiency of picking the workpieces may be improved by picking the second workpiece prior to the first workpiece.

In some examples, the circuitry may be configured to: estimate, for each of the n workpieces, a physical quantity related to picking of a workpiece from the conveying surface based on the position; and determine the picking order based on the physical quantity of each of the n workpieces. In this case, the picking order is determined based on the physical quantity related to the picking of the workpiece. The physical quantity indicates a cost of the picking of the workpiece. This configuration therefore allows the workpieces to be efficiently picked in consideration of the cost.

In some examples, the circuitry may be configured to execute dynamic programming based on the physical quantity, as the optimization algorithm, to determine the picking order. Since the calculation time for determining the picking order is shortened by using the dynamic programming, the picking of the workpiece by the robot may be started earlier. As a result, the workpieces may be picked more efficiently.

In some examples, the circuitry may be configured to: execute the dynamic programming to estimate a total physical quantity for each of a plurality of candidate orders corresponding to the n workpieces; and determine the picking order from the plurality of candidate orders based on a plurality of total physical quantities. An optimal picking order is determined for a set of two or more workpieces by taking into consideration the total physical quantity required to the picking of the two or more workpieces in the window, instead of focusing on only one workpiece. The workpiece may be therefore picked more efficiently.

In some examples, the robot may be configured to move each of the m workpieces to a common designated place, and the circuitry may be configured to estimate, for each of the n workpieces, the physical quantity for moving the workpiece from the conveying surface to the designated place. By applying the robot system in an environment in which the destination of the workpiece is designated at one place, the physical quantity may be estimated more succinctly by a calculation using the dynamic programming. As a result, the optimum picking order may be determined more accurately.

In some examples, the robot may be configured to, for each of the m workpieces, move the workpiece to a designated place corresponding to the workpiece, and the circuitry may be configured to, for each of the n workpieces, estimate, for each of a plurality of candidate places that are candidates for the designated place, the physical quantity for moving the workpiece from the conveying surface to the candidate place. In this case, for each workpiece, movements to each of the plurality of candidate places are further taken into account to estimate individual physical quantities. The workpiece may therefore be efficiently picked while also optimizing the destination of the workpiece.

In some examples, the robot system may further include a storage device configured to store a data table indicating a distribution of physical quantities on the conveying surface, and the circuitry may be configured to, for each of the n workpieces, refer to the data table in the storage device based on the position to acquire the physical quantity. Since the physical quantity is acquired from the data table prepared in advance, the calculation time for acquiring the physical quantity is saved. Accordingly, the picking of the workpiece by the robot may be started earlier, and thus the workpieces may be picked more efficiently.

In some examples, the circuitry may be configured to estimate a required time required to pick the workpiece from the conveying surface, as the physical quantity.

In some examples, the circuitry may be configured to estimate the required time based on a round-trip travelling time of the robot at a distance from a common position to the position of the workpiece, a picking time for the robot to pick the workpiece at the position of the workpiece, and a placing time for the robot to place the workpiece at the common position.

In some examples, the circuitry may be configured to estimate, as the required time, a sum of the round-trip travelling time, the picking time, and the placing time.

In some examples, the circuitry may be configured to, as at least part of the optimization algorithm: generate a plurality of candidate orders that are candidates for the picking order and a plurality of physical quantities corresponding to the plurality of candidate orders by an iterative process of n loops; and determine the picking order from the plurality of candidate orders based on the plurality of physical quantities.

In some examples, the circuitry may be configured to determine the picking order from the plurality of candidate orders by using the physical quantity of each of the n workpieces at least in a first loop of the iterative process.

In some examples, the circuitry may be configured to: generate, in a (k−1)-th loop of the iterative process, a first set of one or more of the candidate orders, each of which is defined by an order of (k−1) workpieces, and a second set of one or more of the physical quantities corresponding to the first set; and generate, in a k-th loop of the iterative process, a third set of one or more of the candidate orders, each of which is defined by an order of k workpieces, and a fourth set of one or more of the physical quantities corresponding to the third set, based on the first set and the second set.

In some examples, in the k-th loop, the circuitry may be configured to, with respect to the order of the k workpieces: generate a plurality of combinations related to the order of the k workpieces by using the first set; estimate the physical quantity based on the second set for each of the plurality of combinations; select one physical quantity from a plurality of the physical quantities corresponding to the plurality of combinations; select, from the plurality of combinations, the order of the k workpieces corresponding to the selected physical quantity; and include the selected order in the third set.

In some examples, the conveying surface may have a moving direction in which the plurality of workpieces move and a width direction orthogonal to the moving direction, and the circuitry may be configured to set the window based on the plurality of workpieces that move along the conveying surface in a state of being randomly arranged in at least one of the moving direction and the width direction. In an environment where the plurality of workpieces move at random, the workpieces may be efficiently picked.

In some examples, the circuitry may be configured to set an order in which the workpieces are detected by a sensor monitoring the conveying surface, as the inflow order. Since the n workpieces in the window are selected based on the order in which the workpieces are detected, the window may be appropriately set in accordance with the situation of the workpieces on the conveying surface. As a result, the workpiece that should be processed first may be picked efficiently.

In some examples, the circuitry may be configured to: add the plurality of workpieces that move along the conveying surface in the inflow order, to an array; and set the window for the n workpieces based on the array.

We claim all modifications and variations coming within the spirit and scope of the subject matter claimed herein.

Regarding the above examples, the following appendices are provided by way of further illustration.

(Appendix 1) A robot system comprising:
  a window setting unit configured to set, based on a plurality of workpieces that move along a conveying surface, a window corresponding to n workpieces, where n>1;
  an order determination unit configured to determine a picking order for the window by an optimization algorithm, based on a position of each of the n workpieces;
  a target selection unit configured to select m workpieces from the window based on the picking order, where n>m; and
  a robot configured to pick the n workpieces from the conveying surface in the picking order.

(Appendix 2) The robot system according to appendix 1, further comprising an iteration control unit configured to cause the robot to repeatedly execute the picking,
  wherein, each time the m workpieces are picked from the conveying surface by the robot, the iteration control unit is configured to:
    cause the window setting unit to replace the m workpieces in the window with one or more workpieces of the plurality of workpieces to update the window;
    cause the order determination unit to determine a next picking order for the updated window;
    cause the target selection unit to select next m workpieces from the updated window based on the next picking order; and
    cause the robot to pick the next m workpieces from the conveying surface in the next picking order.

(Appendix 3) The robot system according to appendix 1 or 2, wherein the order determination unit is configured to:
- estimate, for each of the n workpieces, a physical quantity related to picking of a workpiece based on the position; and
- determine the picking order based on the physical quantity of each of the n workpieces.

(Appendix 4) The robot system according to appendix 3, wherein the order determination unit is configured to execute dynamic programming based on the physical quantity, as the optimization algorithm, to determine the picking order.

(Appendix 5) The robot system according to appendix 4, wherein the order determination unit is configured to:
- execute the dynamic programming to estimate a total physical quantity for each of a plurality of candidate orders corresponding to the n workpieces; and
- determine the picking order from the plurality of candidate orders based on a plurality of total physical quantities.

(Appendix 6) The robot system according to appendix 4 or 5,
- wherein the robot is configured to move each of the m workpieces to a common designated place, and
- wherein the order determination unit is configured to estimate, for each of the n workpieces, the physical quantity for moving the workpiece from the conveying surface to the designated place.

(Appendix 7) The robot system according to appendix 4 or 5,
- wherein the robot is configured to, for each of the m workpieces, move the workpiece to a designated place corresponding to the workpiece, and
- wherein the order determination unit is configured to, for each of the n workpieces, estimate, for each of a plurality of candidate places that are candidates for the designated place, the physical quantity for moving the workpiece from the conveying surface to the candidate place.

(Appendix 8) The robot system according to any one of appendices 3 to 7, further comprising a storage unit configured to store a data table indicating a distribution of physical quantities on the conveying surface,
- wherein the order determination unit is configured to, for each of the n workpieces, refer to the data table based on the position to acquire the physical quantity.

(Appendix 9) The robot system according to any one of appendices 1 to 8,
- wherein the conveying surface has a moving direction in which the plurality of workpieces move and a width direction orthogonal to the moving direction, and
- wherein the window setting unit is configured to set the window based on the plurality of workpieces that move along the conveying surface in a state of being randomly arranged in at least one of the moving direction and the width direction.

(Appendix 10) The robot system according to any one of appendices 1 to 9, wherein the window setting unit is configured to select the n workpieces corresponding to the window, based on an order in which the workpieces are detected by a sensor monitoring the conveying surface.

(Appendix 11) A robot system comprising:
- an order determination unit configured to execute dynamic programming based on a position of each of a plurality of workpieces that move along a conveying surface, to determine a picking order for the plurality of workpieces;
- a target selection unit configured to select at least one workpiece from the plurality of workpieces; and
- a robot configured to pick the at least one workpiece from the conveying surface in the picking order.

(Appendix 12) A workpiece management system comprising:
- a window setting unit configured to set, based on a plurality of workpieces that move along a conveying surface, a window corresponding to n workpieces, where n>1;
- an order determination unit configured to determine a picking order for the window by an optimization algorithm, based on a position of each of the n workpieces; and
- a target selection unit configured to select, as target workpieces that are to be picked from the conveying surface, m workpieces from the window based on the picking order, where n>m.

(Appendix 13) A robot control method executed by a robot control system including at least one processor, the method comprising:
- setting, based on a plurality of workpieces that move along a conveying surface, a window corresponding to n workpieces, where n>1;
- determining a picking order for the window by an optimization algorithm, based on a position of each of the n workpieces;
- selecting m workpieces from the window based on the picking order, where n>m; and
- controlling a robot to pick the m workpieces from the conveying surface in the picking order.

(Appendix 14) A workpiece management program for causing a computer to execute:
- setting, based on a plurality of workpieces that move along a conveying surface, a window corresponding to n workpieces, where n>1;
- determining a picking order for the window by an optimization algorithm, based on a position of each of the n workpieces;
- selecting, as target workpieces that are to be picked from the conveying surface, m workpieces from the window based on the picking order, where n>m.

What is claimed is:

1. A robot system comprising circuitry and a robot, wherein the circuitry is configured to:
- set, based on a plurality of workpieces that move along a conveying surface, a window corresponding to n workpieces of the plurality of workpieces, according to an inflow order that is an order in which the plurality of workpieces have moved along the conveying surface, where n>1, and wherein the window is a data structure that virtually indicates the n workpieces;
- determine a picking order for the window by an optimization algorithm, based on a position of each of the n workpieces on the conveying surface, the picking order being an order of picking one or more of the workpieces from the conveying surface and being different from the inflow order; and
- select m workpieces from the window based on the picking order, where n>m,
- wherein the robot is configured to pick the selected m workpieces from the conveying surface in the picking order, and
- wherein the circuitry is configured to, each time the m workpieces are picked from the conveying surface by the robot:

delete the m workpieces from the window, while leaving at least one workpiece of the n workpieces in the window;

add one or more workpieces of the plurality of workpieces to the window thereby updating the window to include the one or more workpieces and the at least one workpiece that is left in the window after deleting the m workpieces;

determine a next picking order for the updated window;

select next m workpieces from the updated window based on the next picking order; and cause the robot to pick the next m workpieces from the conveying surface in the next picking order.

2. The robot system according to claim 1, wherein the circuitry is configured to:

estimate, for each of the n workpieces, a physical quantity related to picking a workpiece from the conveying surface based on the position; and determine the picking order based on the physical quantity of each of the n workpieces.

3. The robot system according to claim 2, wherein the circuitry is configured to execute dynamic programming based on the physical quantity, as the optimization algorithm, to determine the picking order.

4. The robot system according to claim 3, wherein the circuitry is configured to:

execute the dynamic programming to estimate a total physical quantity for each of a plurality of candidate orders corresponding to the n workpieces; and determine the picking order from the plurality of candidate orders based on a plurality of total physical quantities.

5. The robot system according to claim 3, wherein the robot is configured to move each of the m workpieces to a common designated place, and wherein the circuitry is configured to estimate, for each of the n workpieces, the physical quantity for moving the workpiece from the conveying surface to the designated place.

6. The robot system according to claim 3, wherein the robot is configured to, for each of the m workpieces, move the workpiece to a designated place corresponding to the workpiece, and wherein the circuitry is configured to, for each of the n workpieces, estimate, for each of a plurality of candidate places that are candidates for the designated place, the physical quantity for moving the workpiece from the conveying surface to the candidate place.

7. The robot system according to claim 2, further comprising a storage device configured to store a data table indicating a distribution of physical quantities on the conveying surface, wherein the circuitry is configured to, for each of the n workpieces, refer to the data table in the storage device based on the position to acquire the physical quantity.

8. The robot system according to claim 2, wherein the circuitry is configured to estimate a required time required to pick the workpiece from the conveying surface, as the physical quantity.

9. The robot system according to claim 8, wherein the circuitry is configured to estimate the required time based on a round-trip travelling time of the robot at a distance from a common position to the position of the workpiece, a picking time for the robot to pick the workpiece at the position of the workpiece, and a placing time for the robot to place the workpiece at the common position.

10. The robot system according to claim 9, wherein the circuitry is configured to estimate, as the required time, a sum of the round-trip travelling time, the picking time, and the placing time.

11. The robot system according to claim 2, wherein the circuitry is configured to, as at least part of the optimization algorithm:

generate a plurality of candidate orders that are candidates for the picking order and a plurality of physical quantities corresponding to the plurality of candidate orders by an iterative process of n loops; and determine the picking order from the plurality of candidate orders based on the plurality of physical quantities.

12. The robot system according to claim 11, wherein the circuitry is configured to determine the picking order from the plurality of candidate orders by using the physical quantity of each of the n workpieces at least in a first loop of the iterative process.

13. The robot system according to claim 12, wherein the circuitry is configured to:

generate, in a (k−1)-th loop of the iterative process, a first set of one or more of the candidate orders, each of which is defined by an order of (k−1) workpieces, and a second set of one or more of the physical quantities corresponding to the first set; and generate, in a k-th loop of the iterative process, a third set of one or more of the candidate orders, each of which is defined by an order of k workpieces, and a fourth set of one or more of the physical quantities corresponding to the third set, based on the first set and the second set.

14. The robot system according to claim 13, wherein, in the k-th loop, the circuitry is configured to, with respect to the order of the k workpieces:

generate a plurality of combinations related to the order of the k workpieces by using the first set;

estimate the physical quantity based on the second set for each of the plurality of combinations;

select one physical quantity from a plurality of the physical quantities corresponding to the plurality of combinations;

select, from the plurality of combinations, the order of the k workpieces corresponding to the selected physical quantity; and include the selected order in the third set.

15. The robot system according to claim 1, wherein the conveying surface has a moving direction in which the plurality of workpieces move and a width direction orthogonal to the moving direction, and wherein the circuitry is configured to set the window based on the plurality of workpieces that move along the conveying surface in a state of being randomly arranged in at least one of the moving direction and the width direction.

16. The robot system according to claim 1, wherein the circuitry is configured to set an order in which the workpieces are detected by a sensor monitoring the conveying surface, as the inflow order.

17. The robot system according to claim 1, wherein the circuitry is configured to:

add the plurality of workpieces that move along the conveying surface in the inflow order, to an array; and set the window for the n workpieces based on the array.

18. A robot control method executable by a robot control system including at least one processor, the method comprising:

setting, based on a plurality of workpieces that move along a conveying surface, a window corresponding to n workpieces of the plurality of workpieces, according to an inflow order that is an order in which the plurality of workpieces have moved along the conveying surface, where n>1, and wherein the window is a data structure that virtually indicates the n workpieces;

determining a picking order for the window by an optimization algorithm, based on a position of each of the n workpieces on the conveying surface, the picking order being an order of picking one or more of the workpieces from the conveying surface and being different from the inflow order;

selecting m workpieces from the window based on the picking order, where n>m;

controlling a robot to pick the selected m workpieces from the conveying surface in the picking order;

deleting the m workpieces from the window, while leaving at least one workpiece of the n workpieces in the window;

adding one or more workpieces of the plurality of workpieces to the window thereby updating the window to include the one or more workpieces and the at least one workpiece that is left in the window after deleting the m workpieces;

determining a next picking order for the updated window;

selecting next m workpieces from the updated window based on the next picking order; and controlling the robot to pick the next m workpieces from the conveying surface in the next picking order.

19. A non-transitory computer-readable storage medium storing processor-executable instructions to:

set, based on a plurality of workpieces that move along a conveying surface, a window corresponding to n workpieces of the plurality of workpieces, according to an inflow order that is an order in which the plurality of workpieces have moved along the conveying surface, where n>1, and wherein the window is a data structure that virtually indicates the n workpieces;

determine a picking order for the window by an optimization algorithm, based on a position of each of the n workpieces on the conveying surface, the picking order being an order of picking one or more of the workpieces from the conveying surface and being different from the inflow order;

select m workpieces from the window based on the picking order, where n>m;

control a robot to pick the selected m workpieces from the conveying surface in the picking order;

delete the m workpieces from the window, while leaving at least one workpiece of the n workpieces in the window;

add one or more workpieces of the plurality of workpieces to the window thereby updating the window to include the one or more workpieces and the at least one workpiece that is left in the window after deleting the m workpieces;

determine a next picking order for the updated window;

select next m workpieces from the updated window based on the next picking order; and control the robot to pick the next m workpieces from the conveying surface in the next picking order.

20. The robot system according to claim 1, wherein the at least one workpiece left in the window includes a first workpiece, and the one or more workpieces added to the window includes a second workpiece, and wherein the next picking order for the updated window is determined by arranging the second workpiece ahead of the first workpiece in the next picking order, to cause the robot to preferentially select the second workpiece prior to the first workpiece when picking the next m workpieces from the conveying surface.

* * * * *